(12) United States Patent
Zhao (10) Patent No.: US 12,416,323 B2
(45) Date of Patent: Sep. 16, 2025

(54) LOCKING MECHANISM AND CARRYING DEVICE

(71) Applicant: WODE GLOBAL (QINGDAO) OUTDOOR CO.LTD, Qingdao (CN)

(72) Inventor: Yingchun Zhao, Shandong (CN)

(73) Assignee: WODE GLOBAL (QINGDAO) OUTDOOR CO.LTD, Qingdao (CN)

( * ) Notice: Subject to any disclaimer, the term of this patent is extended or adjusted under 35 U.S.C. 154(b) by 266 days.

(21) Appl. No.: 18/369,850

(22) Filed: Sep. 19, 2023

(65) Prior Publication Data

US 2024/0159260 A1 May 16, 2024

(30) Foreign Application Priority Data

Aug. 11, 2023 (CN) .......................... 202322161940.6

(51) Int. Cl.
*F16B 2/06* (2006.01)
*B60R 9/00* (2006.01)

(52) U.S. Cl.
CPC . *F16B 2/06* (2013.01); *B60R 9/00* (2013.01)

(58) Field of Classification Search
CPC ..................................... F16B 2/06; F16B 2/12
See application file for complete search history.

(56) References Cited

U.S. PATENT DOCUMENTS

| | | | | |
|---|---|---|---|---|
| 6,837,646 | B1* | 1/2005 | Minger | F16L 13/147 403/374.1 |
| 8,366,340 | B2* | 2/2013 | Munakata | F16B 37/045 403/231 |
| 2017/0175800 | A1* | 6/2017 | Nehls | F16B 43/00 |
| 2023/0040516 | A1* | 2/2023 | Huang | F16B 7/187 |
| 2024/0052860 | A1* | 2/2024 | Lei | F16B 2/12 |

* cited by examiner

*Primary Examiner* — Daniel J Wiley
(74) *Attorney, Agent, or Firm* — Hawaii Patent Services; Nathaniel K. Fedde; Kenton N. Fedde (57) ABSTRACT

A locking mechanism and a carrying device are disclosed. The carrying device includes the locking mechanism and a sleeve pipe. The sleeve pipe is provided with a first through opening. The locking mechanism includes: a housing for at least partially being accommodated in the sleeve pipe, wherein the housing has an accommodating room, a second through opening and a third through opening; an actuator configured to pass through the first through opening and the second through opening sequentially; a pressing member sleeved on an outer peripheral surface of the actuator; a clamping member located at the third through opening and the pressing member. The actuator is configured to bring the pressing member to move relative to the housing so as to lock or unlock the locking mechanism with the sleeve pipe.

15 Claims, 6 Drawing Sheets

LOCKING MECHANISM AND CARRYING DEVICE

CROSS-REFERENCE TO RELATED APPLICATIONS

The present application claims priority to and benefit of China patent application No. 202322161940.6, filed on Aug. 11, 2023, which is hereby incorporated by reference in its entirety.

FIELD

The disclosure relates to the technical field of locking devices, in particular to a locking mechanism and a carrying device.

BACKGROUND

During the carrying process of a vehicle rack (such as a rack used to carry a bicycle), when the weight of the carrying object (such as a bicycle) is too large, or the carrying/supporting operation occurs in an application scenario with complex force conditions and frequent external impacts or collisions, the problem that the vehicle rack is easy to fall off often occurs. At present, the common locking manner of vehicle racks on the market are mostly single-sided or double-sided locking. The locking force between these locking structures and the vehicle is relatively limited, and the locking effect is poor, which cannot meet the more stringent application requirements.

For the above reasons, how to improve the locking effect of the vehicle rack has become an urgent problem to be solved.

SUMMARY

Aspects of this disclosure involve a locking mechanism and a carrying device to obtain a more firm and reliable locking effect.

To achieve the above objects, the present disclosure provides the following technical solutions:

A locking mechanism for locking with a sleeve pipe, wherein the sleeve pipe is provided with a first through opening along a first direction, comprising:
- a housing for being accommodated at least partially in the sleeve pipe, wherein the housing has an accommodating room and a second through opening and a third through opening respectively communicating with the accommodating room, wherein the second through opening passes through the housing along the first direction and is arranged corresponding to the first through opening, and the third through opening extends through the housing along a second direction, an actuator configured to pass through the first through opening and the second through opening sequentially along the first direction,
- a pressing member accommodated in the accommodating room and sleeved on an outer peripheral surface of the actuator,
- at least one clamping member accommodated in the accommodating room and located between the third through opening and the pressing member in the second direction,
wherein the first direction and the second direction are perpendicular to each other, wherein the actuator is configured to bring the pressing member to move relative to the housing along the first direction, so that the pressing member presses the at least one clamping member and thus the at least one clamping member abuts against an inner wall of the sleeve pipe, thereby locking the locking mechanism with the sleeve pipe, and wherein the actuator is configured to bring the pressing member to move relative to the housing along the first direction, so that the pressing member releases the at least one clamping member in such a way that the at least one clamping member does not abut against the inner wall of the sleeve pipe, thereby unlocking the locking mechanism from the sleeve pipe.

In some embodiments of the disclosure, the locking mechanism further comprises a locking member arranged outside the sleeve pipe and detachably connected to an end of the actuator.

In some embodiments of the disclosure, between the pressing member and the actuator a threaded transmission connection is provided.

In some embodiments of the disclosure, a side of the pressing member close to the at least one clamping member is provided with a first contact surface, and a side of the at least one clamping member close to the pressing member is provided with a second contact surface, wherein the first contact surface and the second contact surface are parallel to each other or profiling each other. When the locking mechanism is locked, the pressing member presses the at least one clamping member so that the first contact surface and the second contact surface come into contact, or when the locking mechanism is unlocked, the pressing member releases the at least one clamping member so that the first contact surface and the second contact surface do not press against each other or separate from each other.

In some embodiments of the disclosure, a side of the at least one clamping member close to the pressing member in the second direction covers two sides of the pressing member in the third direction. Alternatively, a side of the pressing member close to the at least one clamping member in the second direction covers two sides of the at least one clamping member in the third direction, wherein the first direction, the second direction and the third direction are perpendicular to each other.

In some embodiments of the disclosure, a shape of a cross section of the pressing member along the first direction is convex, and a shape of a cross section of the at least one clamping member along the first direction is concave. Alternatively, a shape of a cross section of the pressing member along the first direction is concave, and a shape of a cross section of the at least one clamping member along the first direction is convex.

In some embodiments of the disclosure, the housing comprises two third through openings. The two third through openings are respectively disposed on two sides of the actuator along the second direction.

The locking mechanism comprises two clamping members. The two clamping members are respectively arranged corresponding to one of the third through openings.

The locking mechanism comprises two pressing members. The two pressing members are respectively arranged corresponding to one of the clamping members. Alternatively, the pressing member has two first contact surfaces. The two first contact surfaces are respectively located at two sides of the pressing member in the second direction, and respectively correspond to a second contact surface of one of the clamping members.

In some embodiments of the disclosure, the pressing member has a first end and a second end. The first end and the second end are located on two sides of the pressing member in the first direction, respectively.

A dimension of at least a part of the pressing member in the second direction gradually increases along the first direction from the first end to the second end.

In some embodiments of the disclosure, the locking mechanism further comprises an elastic member at least partially accommodated in the accommodating room, extending along the first direction, and sleeved on an outer peripheral surface of the actuator. An end of the elastic member abuts against the second end of the pressing member, and the other end abuts against an inner wall of the housing.

To achieve the above objects, the present disclosure provides the following technical solutions:

a carrying device, comprising:

a main body, a sleeve pipe connected with the main body, and the locking mechanism as defined above, wherein the housing of the locking mechanism is at least partially accommodated in the sleeve pipe, and the actuator in the locking mechanism passes through the first through opening of the sleeve pipe along the first direction.

Compared with the prior art, the technical solution of the present disclosure has the following beneficial effects:

The locking mechanism provided by the present disclosure can be inserted into the sleeve pipe, and establishes a firm, reliable and stable locking and fixing effect with the sleeve pipe, so that the locking mechanism can be locked and fixed with the sleeve pipe. Applying the locking mechanism to equipment including vehicle racks, etc., can provide a stable and firm fixing effect for the vehicle racks, and enable the vehicle racks to exhibit reliable stability, when used in an environment with many impacts or collisions and complex force conditions.

BRIEF DESCRIPTION OF THE DRAWINGS

To illustrate the technical solutions more clearly in the embodiments of the present disclosure, the drawings that need to be used in the description of the embodiments will be briefly introduced below. Obviously, the drawings in the following description are only some embodiments of the present disclosure. For those skilled in the art, other drawings can also be obtained based on these drawings without any creative effort.

LIST OF REFERENCE SIGNS

X first direction
Y second direction
Z third direction
1 sleeve pipe
11 first through opening
2 housing
20 accommodating room
21 second through opening
22 third through opening
3 actuator
4 pressing member
40 first contact surface
41 first end
42 second end
5 clamping member
50 second contact surface
6 locking member
7 elastic member

DESCRIPTION OF EMBODIMENTS

The following will clearly and completely describe the technical solutions in the embodiments of the present disclosure. Obviously, the described embodiments are only part of the embodiments of the present disclosure, rather than all the embodiments. Based on the embodiments provided in the present disclosure, all other embodiments obtained by those skilled in the art without creative efforts fall within the protection scope of the present disclosure.

The technical solutions of the present disclosure provide a locking mechanism and a carrying device, which will be respectively described in detail below. It should be noted that the description sequence of the following embodiments is not intended to limit the preferred sequence of the embodiments of the present disclosure. And in the following embodiments, the description of each embodiment has its own focus, and for the part not described in detail in a certain embodiment, reference can be made to the relevant descriptions in other embodiments.

It is worth noting that the term "vertical" mentioned in the description of the present disclosure specifically refers to the fact that the angle between two objects or between two directions can be 90°, or it can be an included angle within the range of 90°±20°. Exemplarily, the included angle may be 80° or 85°, or may be 100° or 105°.

When an element or member is referred to as being "on," "connected to," or "coupled to" another element or member, it may be directly on, connected to, or coupled to the other element or member or intervening elements or members may be present. When, however, an element or member is referred to as being "directly on," "directly connected to," or "directly coupled to" another element or member, there are no intervening elements or members present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, members, and/or sections, these elements, components, regions, members, and/or sections should not be limited by these terms. These terms are used to distinguish one element, component, region, member, and/or section from another element, component, region, member, and/or section. Thus, a first element, component, region, member, and/or section discussed below could be termed a second element, component, region, member, and/or section without departing from the teachings of the present disclosure.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Figure 1:
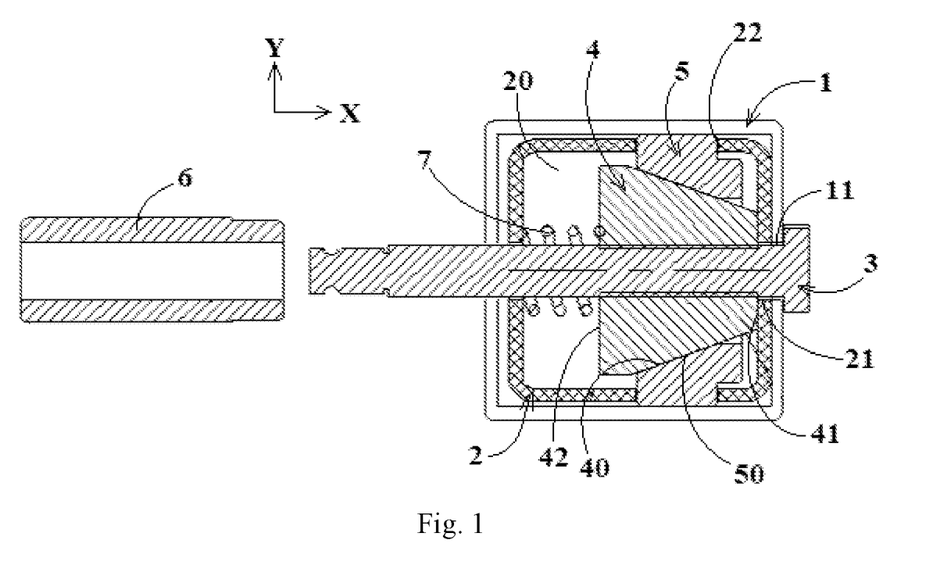
FIG. 1 is a cross-sectional view of the locking mechanism according to a first embodiment of the present disclosure when it is installed in a sleeve pipe.
Figure 2:
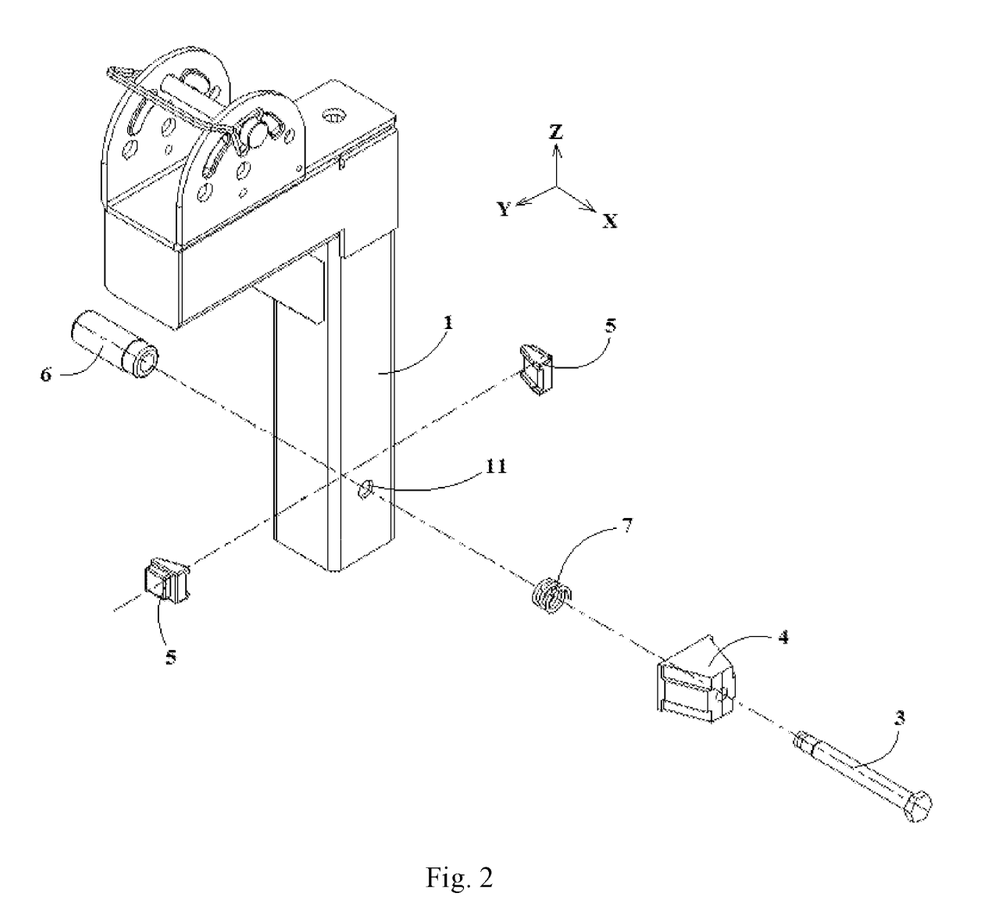
FIG. 2 is an explosive view of the locking mechanism in FIG. 1.

Referring to FIG. 1 and FIG. 2, in some embodiments of the present disclosure, a locking mechanism is used for locking with the sleeve pipe 1. The sleeve pipe 1 is provided with a first through opening 11 along the first direction X. The locking mechanism comprises a housing 2 for being at least partially received in the sleeve pipe 1. The housing 2 has an accommodating room 20, a second through opening 21 and a third through opening 22 communicating with the accommodating room 20, respectively. The second through opening 21 passes through the housing 2 along the first direction X and is arranged corresponding to the first through opening 11. The third through opening 22 extends through the housing 2 along the second direction Y. The locking mechanism further comprises an actuator 3 that is configured to pass through the first through opening 11 and the second through opening 21 sequentially along the first direction X. The locking mechanism further comprises a pressing member 4 that is accommodated in the accommodating room 20 and sleeved on an outer peripheral surface of the actuator 3. The locking mechanism further comprises at least one clamping member 5 that is accommodated in the accommodating room 20 and located between the third through opening 22 and the pressing member 4 in the second direction Y Here, the first direction X and the second direction Y are perpendicular to each other, and the actuator 3 is configured to bring the pressing member 4 to move relative to the housing 2 along the first direction X, so that either the pressing member 4 presses the clamping member 5 and thus the clamping member 5 abuts against an inner wall of the sleeve pipe 1, thereby locking the locking mechanism with the sleeve pipe 1, or the pressing member 4 can release the clamping member 5 in such a way that the clamping member 5 does not abut against the inner wall of the sleeve pipe 1, thereby unlocking the locking mechanism from the sleeve pipe 1.

Specifically, referring to FIG. 1 and FIG. 2, when assembling the locking mechanism with the sleeve pipe 1 according to the present disclosure, the housing 2 is first inserted into the sleeve pipe 1 along the third direction Z, and then the actuator 3, the pressing member 4 and the clamping member 5 are put in. Then, the actuator 3 is rotated around the first direction X as the rotation axis to drive the pressing member 4 to move along the first direction X, and then the clamping member 5 passes through the housing 2 and tightly abuts against the inner wall of the sleeve pipe 1, which can increase the static friction force between the clamping member 5 and the inner wall of the sleeve pipe 1, thereby realizing the locking effect between the locking mechanism and the sleeve pipe 1. In some application scenarios with complex forces, when any one of the sleeve pipe 1 and the locking mechanism is impacted or collided by an external force, there will be a certain movement tendency between the clamping member 5 and the inner wall of the sleeve pipe 1, which tendency is to generate static friction that can ensure a tight fixation between the locking mechanism and the inner wall of the sleeve pipe 1. In addition, when the pressing member 4 moves along the first direction X until it abuts against the inner wall surface of one side of the housing 2 in the first direction X, an end of the pressing member 4 in the first direction X can press the housing 2 to abut against the sleeve pipe 1, so as to realize the locking and fixing effect of this side. It is worth noting that referring to FIG. 1 and FIG. 2, in some embodiments of the present disclosure, the number of the third through openings 22 and the clamping members 5 may be two. Two third through openings 22 and two clamping member 5 are respectively arranged on two sides of the actuator 3 in the second direction Y. Thus, the locking and fixing effect between the locking mechanism and the sleeve pipe 1 can be realized on three sides. Obviously, such a locking and fixing manner has high robustness and reliability, and enables the equipment or device using the locking mechanism to exhibit good locking stability and service reliability in applications with complex force conditions or prone to shocks.

Referring to FIG. 1 and FIG. 2, in some embodiments of the present disclosure, an end of the actuator 3 located outside the sleeve pipe 1 is provided with an enlarged part. When the actuator 3 rotates around the first direction X as the rotation axis, the actuator 3 can translate along the first direction X. When the actuator 3 translates along the first direction X until its enlarged part abuts against the outer wall of the sleeve pipe 1, the translation of the actuator 3 along the first direction X is restricted, but at this time the actuator 3 can still rotate around the first direction X as the rotation axis, and thus bring the pressing member 4 to continue to translate along the first direction X, thereby further forcing the clamping member 5 to move in the third through opening 22 along the second direction Y. At this time, the clamping member 5 can press against the inner wall surface of the sleeve pipe 1 with greater force, so as to provide further locking and fixing effects for the locking mechanism and the sleeve pipe 1. In addition, when the actuator 3 cannot continue to translate along the first direction X, the pressing member 4 can continue to translate along the first direction X and approach the enlarged part. At this time, the housing 2 and the sleeve pipe 1 located between the pressing member 4 and the enlarged part are clamped by the pressing member 4 and the enlarged part, thereby further improving the locking and fixing effects between the locking mechanism and the sleeve pipe 1. In addition, in some application scenarios, a torque may be applied to the enlarged part to rotate the actuator 3, so that the actuator 3 rotates around the first direction X as the rotation axis.

Referring to FIG. 1 and FIG. 2, in some embodiments of the present disclosure, the locking mechanism further comprises a locking member 6 that is arranged outside the sleeve pipe 1 and detachably connected to an end of the actuator 3.

Specifically, referring to FIG. 1 and FIG. 2, in some embodiments of the present disclosure, the locking member 6 is provided with a through screw hole, and threads are provided on an outer peripheral surface of one of the ends of the actuator 3 outside the sleeve pipe 1, so that the actuator 3 and the locking member 6 can be screwed together to further lock the locking mechanism after the locking mechanism is locked with the sleeve pipe 1. In some application scenarios, the locking member 6 can play the role of anti-theft and anti-disassembly, because after the locking member 6 and the actuator 3 are fixed, the actuator 3 cannot be separated from the housing 2 and the sleeve pipe 1. Therefore, the whole locking mechanism cannot be disassembled, thereby fulfilling the function of anti-theft.

Referring to FIG. 1 and FIG. 2, in some embodiments of the present disclosure, between the pressing member 4 and the actuator 3 a threaded transmission connection is provided.

Specifically, when the actuator 3 rotates around the first direction X as the rotation axis, the rotational movement of the actuator 3 is transformed into the translational movement of the pressing member 4 along the first direction X by means of the threaded transmission connection between the pressing member 4 and the actuator 3, so that the pressing member 4 presses or releases the clamping member 5. As a result, the clamping member 5 moves along the second direction Y in the third through opening 22, and then either the clamping member 5 abuts against the inner wall surface of the sleeve pipe 1 so that the locking mechanism is locked and fixed with the sleeve pipe 1, or the clamping member 5 is unlocked with the sleeve pipe 1 so that the locking mechanism is unlocked with the sleeve pipe 1. In addition, the threaded transmission connection between the pressing member 4 and the actuator 3 can also realize the thread self-locking effect between the pressing member 4 and the actuator 3, which can make the pressing member 4 and the actuator 3 self-lock and clamp the housing 2 and the sleeve pipe 1 together along the first direction X, thereby enhancing the locking effect and stability.

It can be understood that the threaded transmission connection may specifically be a thread, which is formed on an outer peripheral surface of the actuator 3, and a through screw hole is provided in the pressing member 4 along the first direction X, so that the threaded part of the actuator 3 is engaged with the through screw hole, so as to realize the force transmission effect between the actuator 3 and the pressing member 4. Apparently, the specific parameters and dimensions of the thread and the through screw hole can be selected and adjusted according to actual application scenarios, and are not limited here. In some embodiments of the present disclosure, the actuator 3 can be a bolt, and the specific shape, specification and corresponding parameters of the bolt can be selected and adjusted according to actual needs. The bolt comprises a connected screw rod and a head, wherein the head is the enlarged part. The screw rod is threadedly connected with the pressing member 4, and an end of the screw rod away from the enlarged part is detachably connected with the locking member 6.

Referring to FIG. 1 and FIG. 2, in some embodiments of the present disclosure, a side of the pressing member 4 close to the clamping member 5 is provided with a first contact surface 40. A side of the clamping member 5 close to the pressing member 4 is provided with a second contact surface 50. Here the first contact surface 40 and the second contact surface 50 are parallel to each other or profiling each other. When the locking mechanism is locked, the pressing member 4 presses the clamping member 5 so that the first contact surface 40 and the second contact surface 50 come into contact, or when the locking mechanism is unlocked, the pressing member 4 releases the clamping member 5 so that the first contact surface 40 and the second contact surface 50 do not press against each other or separate from each other.

It can be understood that the first contact surface 40 and the second contact surface 50 have the characteristics of mutual profiling, and the normal lines of the first contact surface 40 and the second contact surface 50 both intersect the first direction X at an inclination angle. In this way, when the pressing member 4 moves along the first direction X, it can smoothly press the clamping member 5 to move in the third through opening 22 along the second direction Y, so that either the clamping member 5 abuts against the inner wall surface of the sleeve pipe 1 to realize the locking and fixing effects between the locking mechanism and the sleeve pipe 1, or the clamping member 5 and the inner wall of the sleeve pipe 1 are no longer forced against each other, and the two are disengaged to realize the unlocking between the locking mechanism and the sleeve pipe 1.

Referring to FIG. 1 and FIG. 2, in some embodiments of the present disclosure, a side of the clamping member 5 close to the pressing member 4 in the second direction Y covers two sides of the pressing member 4 in the third direction Z. Alternatively, a side of the pressing member 4 close to the clamping member 5 in the second direction Y covers two sides of the clamping member 5 in the third direction Z. Here, the first direction X, the second direction Y and the third direction Z are perpendicular to each other.

It can be understood that by virtue of the technical solutions "the clamping member 5 covers two sides of the pressing member 4 in the third direction Z" and "the pressing member 4 covers two sides of the clamping member 5 in the third direction Z" the locking mechanism according to the present disclosure can show better stability when serving in application scenarios with complex force conditions and frequent external impacts or collisions.

Referring to FIG. 1 and FIG. 2, in some embodiments of the present disclosure, a shape of a cross section of the pressing member 4 along the first direction X is convex, and a shape of a cross section of the clamping member 5 along the first direction X is concave. Alternatively, a shape of a cross section of the pressing member 4 along the first direction X is concave, and a shape of a cross section of the clamping member 5 along the first direction X is convex.

It is worth noting that the specific shape, structure and size design of the pressing member 4 and the clamping member 5 can be selected and adjusted according to actual application scenarios and design standards. However, no matter how the specific shape and size of the pressing member 4 and the clamping member 5 are adjusted and changed, it should be ensured that a good contact between the pressing member 4 and the clamping member 5 will be maintained. This is to ensure that when the pressing member 4 moves along the first direction X, the pressing member 4 can force the clamping member 5 to move in the third through opening 22 along the second direction Y, so that either the clamping member 5 can abut against the inner wall surface of the sleeve pipe 1 to realize the locking and fixing effects between the locking mechanism and the sleeve pipe 1, or the clamping member 5 can be released to realize the unlocking between the locking mechanism and the sleeve pipe 1.

Referring to FIG. 1 and FIG. 2, in some embodiments of the present disclosure, the housing 2 comprises two third through openings 22. The two third through openings 222 are respectively disposed on two sides of the actuator 3 along the second direction Y. The locking mechanism comprises two clamping members 5. The two clamping members 5 are respectively arranged corresponding to one of the third through openings 22. The locking mechanism comprises two pressing members 4. The two pressing members 4 are respectively arranged corresponding to one of the clamping members 5.

Specifically, referring to FIG. 1 and FIG. 2, the third through opening 22 shown at the top of the figure is arranged correspondingly to the clamping member 5. The clamping member 5 can move in the third through opening 22 along the second direction Y, either to abut against the inner wall of the sleeve pipe 1, so that the locking mechanism is locked with the sleeve pipe 1, or the clamping member 5 is unlocked from the sleeve pipe 1. In this way, the locking and unlocking actions between the locking mechanism and the sleeve pipe 1 can be realized on one side in the second direction Y. The third through opening 22 shown at the bottom of the figure is arranged correspondingly to the clamping member 5, and the clamping member 5 can also move in the corresponding third through opening 22 along the second direction Y, so as to realize the locking and unlocking actions between the locking mechanism and the sleeve pipe 1 at the lower position shown in FIGS. 1 and 2. It can be understood that the technical solution realizes locking and unlocking between the locking mechanism and the sleeve pipe 1 at opposite sides in the second direction Y. Obviously, this symmetrical locking manner has good structural stability and service reliability, so that the locking mechanism and the equipment or devices using it can serve in application scenarios with more impacts or collisions and complex force conditions.

In other embodiments of the present disclosure, referring to FIG. 1 and FIG. 2, there is only one pressing member 4 in the locking mechanism, and this pressing member 4 is sleeved on an outer peripheral surface of the actuator 3 and is in a threaded transmission connection with the actuator 3. The rotation of the actuator 3 can drive the pressing member 4 to translate along the first direction X, wherein the pressing member 4 has two first contact surfaces 40. The two first contact surfaces 40 are respectively located at two sides of the pressing member 4 in the second direction Y, and respectively correspond to the second contact surfaces 50 of one of the clamping members 5. Referring to FIG. 1 and FIG. 2, when the actuator 3 moves rightward along the first direction X to pressing the locking member 5, the first contact surface 40 contacts with the corresponding second contact surface 50 so that the pressing member 4 can transmit power through these two contact surfaces sequentially, so as to force the clamping member 5 to move in the third through opening 22 along the second direction Y, and then abut or not abut against the inner wall of the sleeve pipe 1.

It is worth noting that the specific number of pressing members 4 can be selected according to actual application requirements and design standards, and whether the selected pressing members 4 are manufactured in one member or in two separate parts. Correspondingly, the third through opening 22 and the clamping member 5 are also manufactured in multiples, so as to be paired with each pressing member 4 for use.

Referring to FIG. 1 and FIG. 2, in some embodiments of the present disclosure, the pressing member 4 has a first end 41 and a second end 42. The first end 41 and the second end 42 are located on two sides of the pressing member 4 in the first direction X, respectively. The dimension of at least a part of the pressing member 4 in the second direction Y gradually increases along the first direction X from the first end 41 to the second end 42. Apparently, such a design can ensure that when the pressing member 4 moves along the first direction X, the pressing member 4 can stably and smoothly press and drive the clamping member 5 to move in the third through opening 5 along the second direction Y, so that the clamping member 5 can either abut against the inner wall of the sleeve pipe 1 or be unlocked. It is worth noting that the unlocking described in the description of the present disclosure includes the situation that the clamping member 5 is in contact with the inner wall of the sleeve pipe 1, but does not apply force to each other, that is, neither of them is pressed by the other. It also includes the situation that the clamping member 5 is away from the inner wall of the sleeve pipe 1, and the clamping member 5 is no longer in contact with the sleeve pipe 1.

It is worth noting that, referring to FIG. 1, the inclination angle between the normal direction of the first contact surface 40 of the pressing member 4 and the first direction X, or the degree of inclination between the first end 41 and the second end 42, has a certain numerical conversion relationship with the translational distance of the actuator 3 in the first direction X and the translational distance of the clamping member 5 in the second direction Y. The numerical conversion relationship should comply with the following principle: the translational distance that the pressing member 4 is driven to translate in the first direction X due to the rotation of the actuator 3 around the first direction X as the rotation axis should ensure that the moving distance of the clamping member 5 in the second direction Y is sufficient to enable the clamping member 5 to press against the sleeve pipe 1, thereby ensuring that the locking mechanism can be locked with the sleeve pipe 1.

Referring to FIG. 1 and FIG. 2, in some embodiments of the present disclosure, the locking mechanism further comprises an elastic member 7 that is at least partially accommodated in the accommodating room 20, extends along the first direction X and is sleeved on an outer peripheral surface of the actuator 3. An end of the elastic member 7 abuts against the second end 42 of the pressing member 4, and the other end abuts against the inner wall of the housing 2.

Specifically, in some embodiments of the present disclosure, when in the locking mechanism only one pressing member 4 is provided, or a plurality of pressing members 4 are made into one piece, the pressing member 4 is provided a through screw hole with threads along the first direction X. Moreover, when assembling the locking mechanism and the sleeve pipe 1, the housing 2 is first inserted into the inside of the sleeve pipe 1 along the third direction Z, and then the pressing member 4, the clamping member 5 and the elastic member 7 are put in. Then the actuator 3 is inserted into the first through opening 11 and the second through opening 21 sequentially, and then passes through the through screw hole of the pressing member 4, and then passes through the elastic member 4, a second through opening 21 located on the other side in the first direction X and another first through opening sequentially. Finally, the locking member 6 located outside the sleeve pipe 1 is screwed and tightened with an end of the actuator 3 to realize the locking and unlocking between the locking mechanism and the sleeve pipe 1. The function of the elastic member 7 is to ensure that the position of each part inside the accommodating room 20 will not be misplaced or confused before the actuator 3 is inserted into the accommodating room 20. That is, the function is to position each part located in the accommodating room 20.

It can be understood that, in some embodiments of the present disclosure, a spring can be used as a specific form of the elastic member 7, while the material, size and specification of the spring can be selected and adjusted according to the actual application scene.

It is worth noting that, referring to FIG. 1 and FIG. 2, the locking mechanism according to the present disclosure realizes a three-sided locking effect between the locking mechanism and the sleeve pipe 1 (two contact positions between the clamping member 5 and the inner wall of the sleeve pipe 1, and a contact position between the housing 2 and the sleeve pipe 1 at the corresponding position of the first end 41 of the pressing member 4) by means of the force transmission relationship of the actuator 3, the pressing member 4 and the clamping member 5. A locking effect with higher structural stability is thus obtained, and the structure and components of the locking mechanism are relatively simple, and the assembly and disassembly with the sleeve pipe 1 is also very convenient.

It should be noted that, the locking mechanism according to the present disclosure is not only applicable to the sleeve pipe 1 with a square cross-section along the third direction Z as shown in FIG. 1 and FIG. 2, but also applicable to the sleeve pipe 1 with a circular cross-section along the third direction Z. In this case, it is necessary to adjust the shape of the clamping member 5 adaptively to ensure that the side of the clamping member 5 facing the inner wall of the sleeve pipe 1 has a certain curvature to match the arc-shaped inner wall of the sleeve pipe 1. In addition, in some embodiments of the present disclosure, in order to cooperate with the sleeve pipe 1 with a circular cross-section, the housing 2 of the locking mechanism can also be designed as a circular tube, that is, the housing 2 has a circular cross-section along the third direction Z to cooperate with the round tubular sleeve pipe 1.

Figure 3:
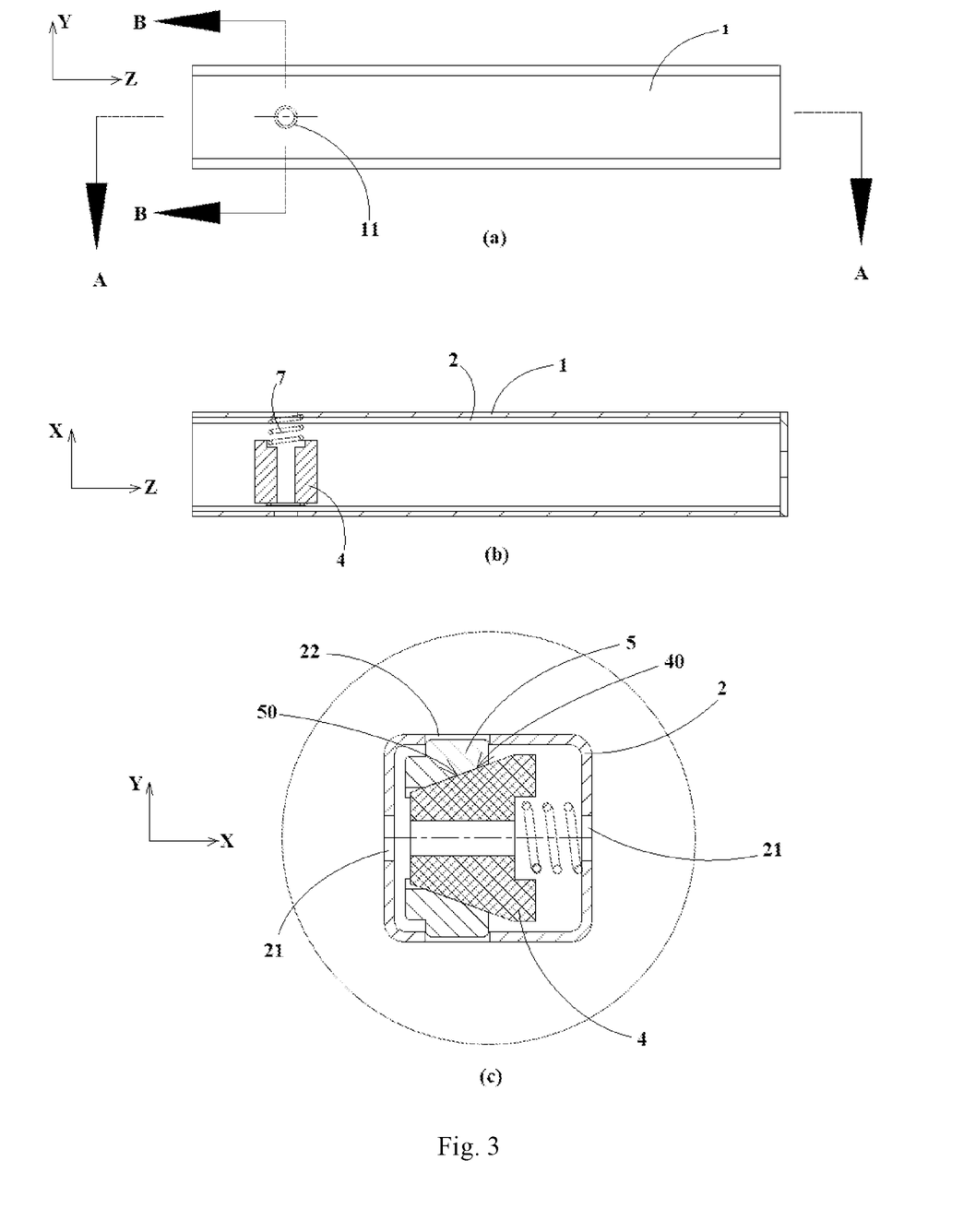
FIG. 3(a) is a structural schematic view of the locking mechanism from a first viewing angle according to a second embodiment of the present disclosure when it is installed in the sleeve pipe.
FIG. 3(b) is a sectional view along A-A of the locking mechanism and the sleeve pipe in FIG. 3(a)
FIG. 3(c) is a sectional view along B-B of the locking mechanism and the sleeve pipe in FIG. 3(a)
Figure 4:
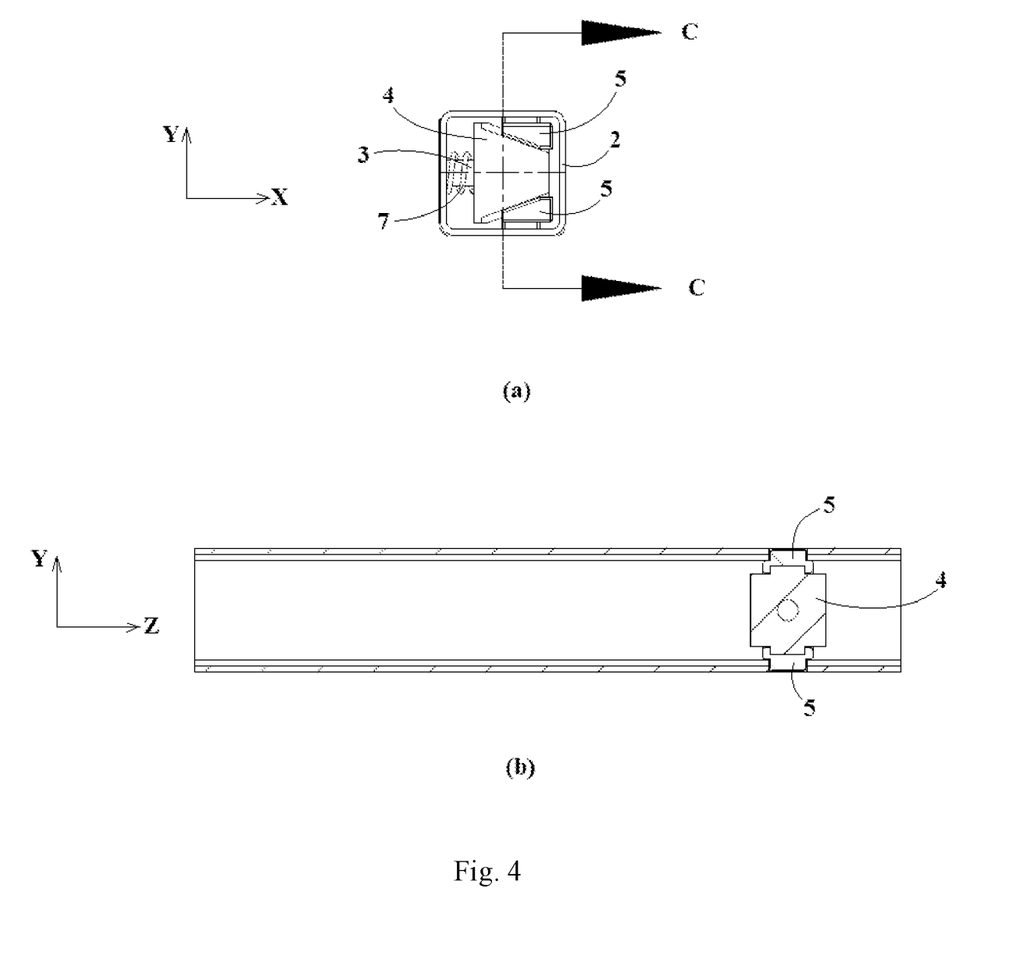
FIG. 4(a) is a structural schematic view of the locking mechanism and the sleeve pipe in FIG. 3(a) from a second viewing angle.
FIG. 4(b) is a sectional view along C-C of the locking mechanism and the sleeve pipe in FIG. 4(a)
Figure 5:
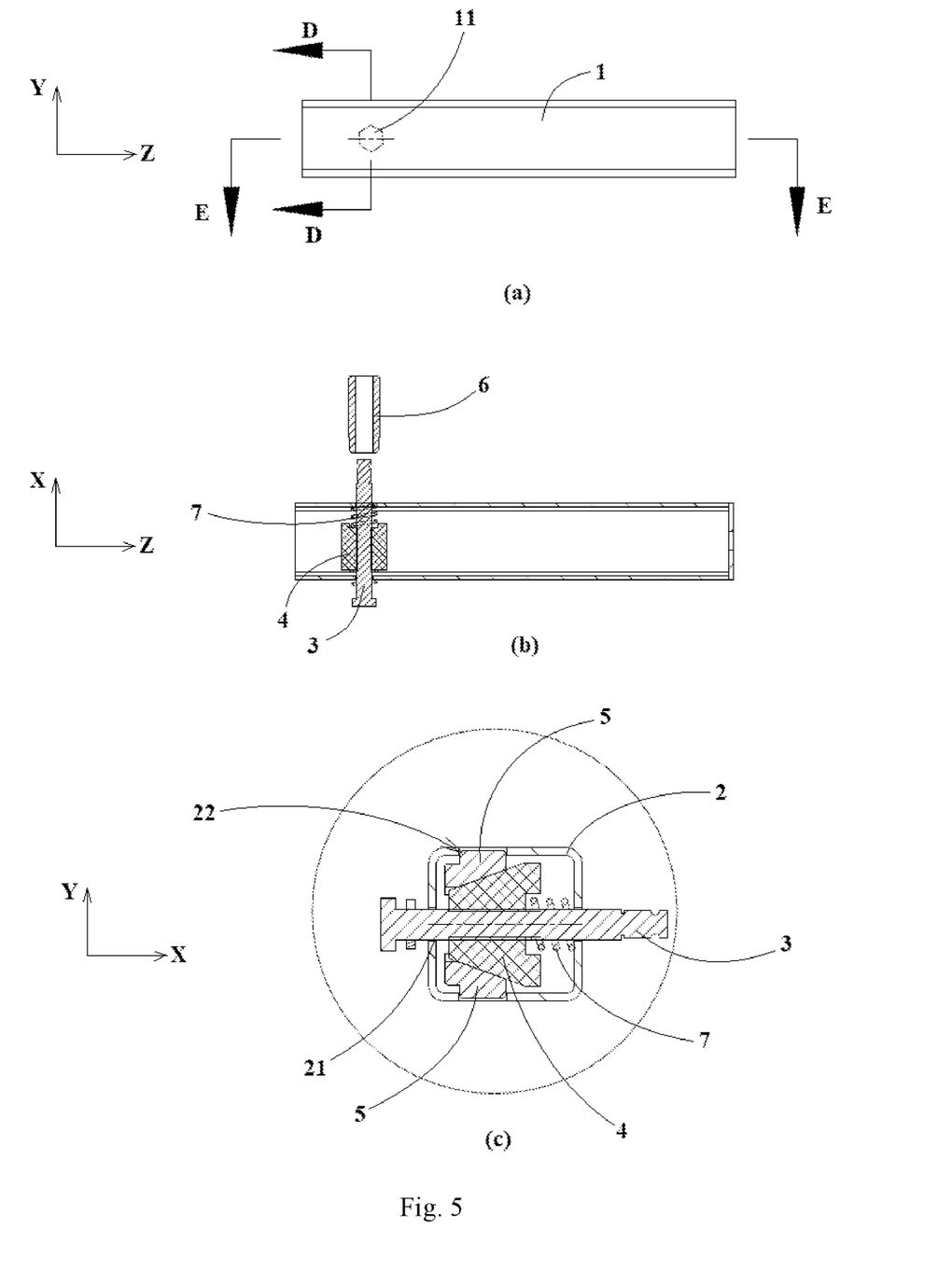
FIG. 5(a) is a structural schematic view of the locking mechanism from a third viewing angle according to a third embodiment of the present disclosure when it is installed in the sleeve pipe.
FIG. 5(b) is a sectional view along D-D of the locking mechanism and the sleeve pipe in FIG. 5(a)
FIG. 5(c) is a sectional view along E-E of the locking mechanism and the sleeve pipe in FIG. 5(a)
Figure 6:
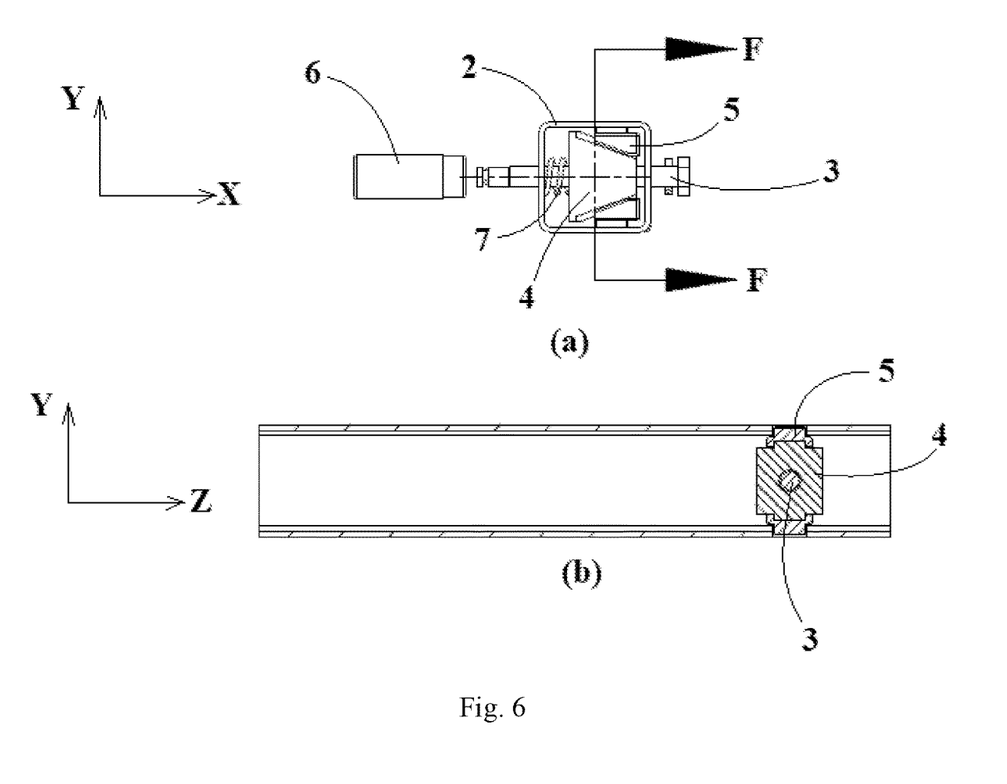
FIG. 6(a) is a structural schematic view of the locking mechanism and the sleeve pipe in FIG. 5(a) from a fourth viewing angle.
FIG. 6(b) is a sectional view along F-F of the locking mechanism and the sleeve pipe in FIG. 6(a)

In order to better understand the specific structure of the locking mechanism according to the present disclosure and its assembly relationship with the sleeve pipe 1, reference is made to FIGS. 3 to 6, where FIGS. 3 and 4 show the state of the locking mechanism and sleeve pipe 1 when the actuator 3 is not inserted into the housing 2, while FIGS. 5 and 6 show the state after the actuator 3 is inserted into the first through opening 11 and assembled with the pressing member 4. Specifically, when assembling the locking mechanism and the sleeve pipe 1, the housing 2 is first inserted into the inside of the sleeve pipe 1 along the third direction Z, and then the clamping member 5, the pressing member 4 and the elastic member 7 are put into the inner hollow room of the housing 2, and then the actuator 3 is inserted into the first through opening 11 along the first direction X, and the actuator 3 is matched with the pressing member 4 to complete the assembly.

In addition, referring to FIG. 4 and FIG. 6, the two ends of the clamping member 5 in the third direction Z wrap a side of the pressing member 4 close to the clamping member 5 so that the clamping member 5 and the pressing member 4 will not slide in the third direction Z, so as to ensure that the locking mechanism and the sleeve pipe 1 can withstand external impact or collision, and thus exhibit good locking reliability and stability.

In some embodiments of the present disclosure, a carrying device is provided, comprising: a main body, a sleeve pipe 1 connected to the main body, and a locking mechanism as described above. The housing 2 of the locking mechanism is at least partially accommodated in the sleeve pipe 1. The actuator 3 in the locking mechanism passes through the first through opening 11 of the sleeve pipe 1 along the first direction X.

Exemplarily, the carrying device may be a vehicle rack, which has a relatively stable effect of carrying objects due to the use of the locking mechanism according to the present disclosure, has good reliability and stability, and is competent for use in various scenes with complex force conditions and many impacts and collisions. Applying the locking mechanism to equipment including vehicle racks, etc., can provide a stable and firm fixing effect for the vehicle racks, and enable the vehicle racks to exhibit reliable stability, when used in an environment with many impacts or collisions and complex force conditions.

The above is only a specific embodiment of the present disclosure, but the scope of protection of the present disclosure is not limited thereto. Any changes or substitutions that can be easily conceived by those skilled in the art within the technical scope disclosed in the present disclosure shall fall within the protection scope of the present disclosure. Therefore, the protection scope of the present disclosure should be determined by the protection scope of the claims. In addition, specific examples are used in the description to illustrate the principles and implementation of the present disclosure. The descriptions of the above examples are only used to help understand the method and core idea of the present disclosure, and the contents of this description should not be construed as limiting the present disclosure.

What is claimed is:

1. A locking mechanism for locking with a sleeve pipe that is provided with a first through opening along a first direction, comprising:
    a housing for being accommodated at least partially in said sleeve pipe, wherein the housing has an accommodating room, a second through opening and a third through opening respectively communicating with said accommodating room, wherein said second through opening extends through said housing along said first direction and is arranged corresponding to said first through opening, and said third through opening extends through said housing along a second direction,
    an actuator configured to pass through said first through opening and said second through opening sequentially along said first direction,
    a pressing member accommodated in said accommodating room and sleeved on an outer peripheral surface of said actuator,
    at least one clamping member accommodated in said accommodating room and located between said third through opening and said pressing member in said second direction Y,
    wherein said first direction and said second direction are perpendicular to each other,
    wherein said actuator is configured to bring said pressing member to move relative to said housing along said first direction, so that said pressing member presses said at least one clamping member and thus said at least one clamping member abuts against an inner wall of said sleeve pipe, thereby locking said locking mechanism with said sleeve pipe, and wherein said actuator is configured to bring said pressing member to move relative to said housing along said first direction, so that said pressing member releases said at least one clamping member in such a way that said at least one clamping member does not abut against said inner wall of said sleeve pipe, thereby unlocking said locking mechanism from said sleeve pipe.

2. The locking mechanism according to claim 1, further comprising a locking member arranged outside said sleeve pipe and detachably connected to an end of said actuator.

3. The locking mechanism according to claim 1, wherein between said pressing member and said actuator a threaded transmission connection is provided.

4. The locking mechanism according to claim 1, wherein a side of said pressing member close to said at least one clamping member is provided with a first contact surface, and a side of said at least one clamping member close to said pressing member is provided with a second contact surface, wherein said first contact surface and said second contact surface are parallel to each other or profiling each other; when said locking mechanism is locked, said pressing member presses said at least one clamping member so that said first contact surface and said second contact surface come into contact.

5. The locking mechanism according to claim 4, wherein when said locking mechanism is unlocked, said pressing member releases said at least one clamping member so that said first contact surface and said second contact surface do not press against each other or separate from each other.

6. The locking mechanism according to claim 5, wherein a side of said at least one clamping member close to said pressing member in said second direction Y covers two sides of said pressing member in a third direction, wherein said first direction, said second direction and said third direction are perpendicular to each other.

7. The locking mechanism according to claim 6, wherein a shape of a cross section of said pressing member along said first direction X is convex, and a shape of a cross section of said at least one clamping member along said first direction X is concave.

8. The locking mechanism according to claim 7, wherein a shape of a cross section of said pressing member along said first direction is concave, and a shape of a cross section of said at least one clamping member along said first direction is convex.

9. The locking mechanism according to claim 5, wherein a side of said pressing member close to said at least one clamping member in said second direction Y covers two sides of said at least one clamping member in said third direction, respectively, wherein said first direction, said second direction and said third direction are perpendicular to each other.

10. The locking mechanism according to claim 9, wherein a shape of a cross section of said pressing member along said first direction X is convex, and a shape of a cross section of said at least one clamping member along said first direction X is concave.

11. The locking mechanism according to claim 10, wherein a shape of a cross section of said pressing member along said first direction is concave, and a shape of a cross section of said at least one clamping member along said first direction is convex.

12. The locking mechanism according to claim 4, wherein said housing comprises two third through openings, and said two third through openings are respectively disposed on two sides of said actuator along said second direction, said locking mechanism comprises two clamping members, and said two clamping members are respectively arranged corresponding to one of said third through openings, wherein said locking mechanism comprises two pressing members, and said two pressing members are respectively arranged corresponding to one of said clamping members, alternatively said pressing member has two first contact surfaces, and said two first contact surfaces are respectively located at two sides of said pressing member in said second direction, and respectively correspond to a second contact surface of one of said clamping members.

13. The locking mechanism according to claim 1, wherein said pressing member has a first end and a second end, and said first end and said second end are located on two sides of said pressing member in said first direction X, respectively, a dimension of at least a part of said pressing member in said second direction gradually increases along said first direction from said first end to said second end.

14. The locking mechanism according to claim 13, further comprising an elastic member at least partially accommodated in said accommodating room, extending along said first direction and sleeved on an outer peripheral surface of said actuator, wherein an end of said elastic member abuts against said second end of said pressing member, and the other end abuts against an inner wall of said housing.

15. A carrying device, comprising:
a main body,
a sleeve pipe connected with said main body, and
a locking mechanism for locking with said sleeve pipe, wherein said sleeve pipe is provided with a first through opening along a first direction, the locking mechanism comprising:
a housing for being accommodated at least partially in said sleeve pipe, wherein the housing has an accommodating room, a second through opening and a third through opening respectively communicating with said accommodating room, wherein said second through opening extends through said housing along said first direction and is arranged corresponding to said first through opening, and said third through opening extends through said housing along a second direction,
an actuator configured to pass through said first through opening and said second through opening sequentially along said first direction,
a pressing member accommodated in said accommodating room and sleeved on an outer peripheral surface of said actuator,
at least one clamping member accommodated in said accommodating room and located between said third through opening and said pressing member in said second direction Y,
wherein said first direction and said second direction are perpendicular to each other,
wherein said actuator is configured to bring said pressing member to move relative to said housing along said first direction, so that said pressing member presses said at least one clamping member and thus said at least one clamping member abuts against an inner wall of said sleeve pipe, thereby locking said locking mechanism with said sleeve pipe, and
wherein said actuator is configured to bring said pressing member to move relative to said housing along said first direction, so that said pressing member releases said at least one clamping member in such a way that said at least one clamping member does not abut against said inner wall of said sleeve pipe, thereby unlocking said locking mechanism from said sleeve pipe.

\* \* \* \* \*